United States Patent [19]

Kanemitsu

[11] Patent Number: 4,942,321
[45] Date of Patent: Jul. 17, 1990

[54] RADIAL MAGNETIC BEARING SYSTEM

[76] Inventor: Yoichi Kanemitsu, 3-7-24, Takada, Chigasaki-shi, Kanagawa-ken, Japan

[21] Appl. No.: 253,516

[22] Filed: Oct. 5, 1988

[30] Foreign Application Priority Data

Oct. 7, 1987 [JP] Japan .............................. 62-254485

[51] Int. Cl.$^5$ .............................................. F16C 39/06
[52] U.S. Cl. .................................................. 310/90.5
[58] Field of Search ......................... 310/90.5; 324/207

[56] References Cited

U.S. PATENT DOCUMENTS

| | | | |
|---|---|---|---|
| 3,238,788 | 3/1966 | Arthur | 310/90.5 |
| 4,659,988 | 4/1987 | Goff | 324/207 |
| 4,794,290 | 12/1988 | Nagasaka | 310/90.5 |

FOREIGN PATENT DOCUMENTS

| | | |
|---|---|---|
| 1750798 | 8/1971 | Fed. Rep. of Germany . |
| 2800960 | 7/1978 | Fed. Rep. of Germany . |
| 2239038 | 2/1975 | France . |
| 0073223 | 5/1982 | Japan .............................. 310/90.5 |
| 57-173614 | 10/1982 | Japan . |
| 60-91020 | 5/1985 | Japan . |
| 61-52411 | 3/1986 | Japan . |

OTHER PUBLICATIONS

Performance of an Electromagnetic Bearing for the Vibration Control of Superficial Shaft, Bradfield, C. D., Roberts J. B., Proc. Instn. Mech. Engineers, vol. 201, No. C3, pp. 201-212; 1987.

Design of a Radial Electromagnetic Bearing for the Vibration Control of a supercritical shaft, Gonhalekar, V., Holmes, R., Proc. Instn. Mech. Engineers, vol. 198, No. 16; 1984.

*Primary Examiner*—R. Skudy
*Attorney, Agent, or Firm*—Armstrong, Nikaido, Marmelstein, Kubovcik & Murray

[57] ABSTRACT

A radial magnetic bearing system for use in turbomachinery, machine tools and so forth is disclosed. A rotary yoke made of a magnetic material is rigidly secured to a rotary shaft, and an electromagnet stator is rigidly secured to a casing. The stator is arranged to generate magnetic attraction forces radially at equi-angular spacings of 120° within a plane perpendicular to the axis of the rotary shaft. Three displacement sensors are arranged such that each sensor measures displacement of the rotary shaft with respect to the casing in the direction of one of the three magnetic attraction forces, thus controlling the level of each magnetic attraction force.

4 Claims, 6 Drawing Sheets

RADIAL MAGNETIC BEARING SYSTEM

BACKGROUND OF THE INVENTION

The present invention relates to a radial magnetic bearing system for use in turbomachinery, machine tools and so forth. More particularly, the present invention relates to a radial magnetic bearing system of the type having a rotor yoke rigidly secured to a rotary shaft with an electromagnet stator rigidly secured to a casing with a minute gap provided between the same and the rotor yoke, the stator being provided with an exciting coil for generating magnetomotive force, and a displacement sensor for measuring relative displacement between the rotary shaft and the casing, wherein magnetic attraction is created between the rotor and the electromagnet stator on the basis of a signal output from the displacement sensor, thereby supporting the rotary shaft in free space at or near the center of the stator.

FIG. 4 is a vertical sectional view showing a representative structure of a spindle which is supportable by a conventional 5-axes control magnetic bearing system while either FIG. 5 is a sectional view taken along the line 1—1 of FIG. 4, and FIG. 6 is a sectional view taken along the line II—II of FIG. 4.

Referring to FIG. 4, a rotary shaft 1 is driven by an electric motor which has a motor stator and a motor rotor 9 which are disposed in the central portion of a casing 7, and the rotary shaft 1 is supported by two radial magnetic bearings respectively disposed on the two sides of the motor and a thrust magnetic bearing which is adjacent to one of the radial magnetic bearings.

Each of the radial magnetic bearings comprises a radial bearing stator 3 provided with a stator coil 5, a radial bearing yoke 4 secured to the rotary shaft 1, and a radial displacement sensor 6. The thrust magnetic bearing comprises a thrust bearing stator 11 provided with a stator coil 12 and a thrust bearing yoke 10 secured to the rotary shaft 1. The reference numeral 2 denotes an emergency rolling bearing.

In this prior art, the magnetic poles of the stator 3 and the sensor elements 6a and 6b of the displacement sensor 6 are arranged as shown in FIGS. 5 and 6. Thus, the magnetic attraction force acts in orthogonal directions, that is, the directions X and Y. Displacement of the rotary shaft 1 in these two directions is detected by the displacement sensor elements 6a and 6b which are disposed in the X- and Y-directions, respectively, and the position of the rotary shaft 1 is controlled on the basis of the detected signal. The control of the position of the rotary shaft 1 in the X-direction is effected by means of magnetic attraction force which is generated between the radial bearing stator 3 and the radial bearing yoke 4 by supplying a predetermined current to either the stator coil element 5A or the stator coil element 5C on the basis of the output of the X-direction displacement sensor element 6a.

FIGS. 7 and 8 respectively show the arrangements of two examples of a control circuit in the prior art for supplying a predetermined current to the stator coils 5A, 5C, 5E, 5F.

In the control circuit shown in FIG. 7, a current from a bias power supply 23' is supplied to the stator coil elements 5E and 5F and, at the same time, a signal output from the radial displacement sensor 6 is led to a phase compensating circuit 21 and a control current generated from a power amplifier 23 is supplied to the stator coil elements 5A and 5C.

In the control circuit shown in FIG. 8, a signal output from the radial displacement sensor 6 is led to the phase compensating circuit 21 and a predetermined voltage $V_B$ is added to each of the two signals, that is, a signal output from the phase compensating circuit 21 and an inverted signal of the output of the circuit 21, and then these two signals are input to power amplifiers 23a and 23c through linear detectors 22a and 22c, respectively, thereby obtaining predetermined currents for supply to the stator coil elements 5A and 5C, respectively.

The above-described conventional radial magnetic bearing system suffers, however, from the disadvantage that four relatively costly power amplifiers are required to effect control in two directions within one plane. Further, the arrangement of the displacement sensor elements shown in FIG. 6 involves the problem that, due to thermal deformation of the casing 7, the rotary shaft 1 or the displacement sensor 6, the sensor 6 may operate erroneously as if the center of the rotary shaft 1 which is to be controlled had been displaced with respect to the center of the bearing, thus causing the rotary member to come into contact with the casing 7 or disabling the control.

SUMMARY OF THE INVENTION

In view of the above-described problems of the prior art, it is a primary object of the present invention to provide a radial magnetic bearing system which is capable of effecting control to ensure that the center of the rotary shaft is coincident with the center of the bearing with a reduced number of power amplifiers and independently of thermal deformation of the displacement sensor.

To this end, the present invention provides a radial magnetic bearing system comprising an electromagnet stator arranged to generate magnetic attraction forces radially at equi-angular spacings of 120° within a plane perpendicular to the axis of the rotary shaft and a displacement sensor which has three displacement sensor elements arranged such that each sensor element measures the displacement of the rotary shaft with respect to the casing in the direction of one of the three magnetic attraction forces. A phase compensating circuit, a voltage adding circuit for bias current, a linear detector and a power amplifier are disposed in series between each of the displacement sensor elements and the corresponding pole coil to control the current supplied to the pole coil.

By virtue of the above-described arrangement, the equilibrium position of the rotary shaft within the magnetic bearing control plane is determined by the resultant of the three magnetic attraction forces. Therefore, even if the relative position between the sensing surface of the displacement sensor and the center of the bearing changes due to, for example, thermal deformation of the casing, the rotor or the displacement sensor, since the tendency of all the displacement sensor elements to change in output is the same, the levels of the attraction forces of all the magnetic poles change by substantially the same amount and there is therefore no change in the position of the center of the rotary shaft before and after the change in relative position. In addition, since it is necessary to provide only one power amplifier to control each of the magnetic poles for the three directions, the number of power amplifiers required to effect magnetic bearing control within one plane (i.e., biaxial control) can be reduced to three. Accordingly, it is possible to dispense with one power amplifier, a relatively costly item, in comparison with the prior art in which four power amplifiers are used.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DESCRIPTION OF THE PREFERRED EMBODIMENTS

One embodiment of the present invention will be described hereinunder in more detail with reference to FIGS. 1 to 3.

Figure 1:
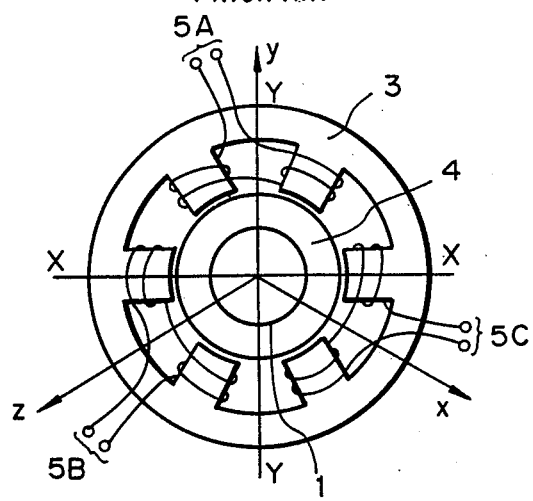
FIG. 1 is a sectional view showing the arrangement of stator magnetic poles, stator coil elements and the rotor of one embodiment of the radial magnetic bearing system according to the present invention.
Figure 4:
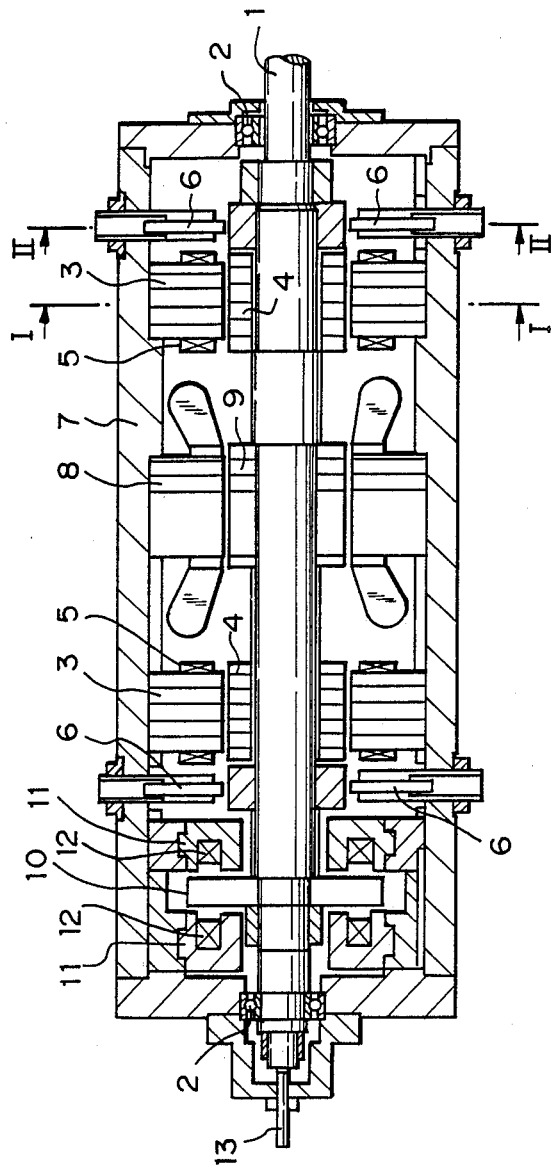
FIG. 4 is a vertical sectional view showing a representative structure of a spindle which is supported by a conventional 5 axes control magnetic bearing system.
Figure 5:
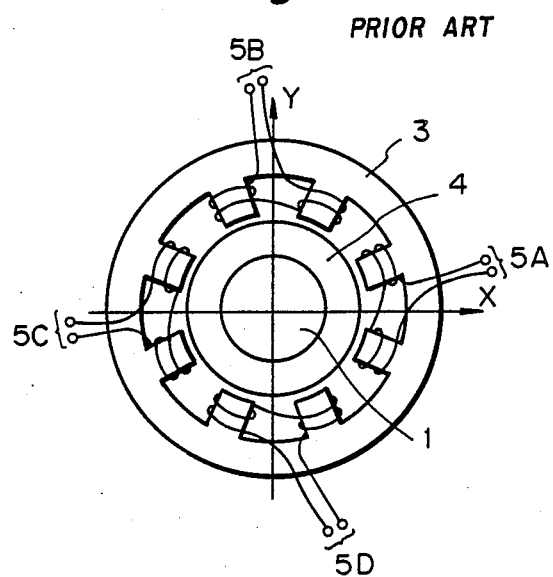
FIG. 5 is a sectional view taken along the line I—I of FIG. 4 if the spindle was supported by a 5-axes control magnetic bearing system in the prior art.
Figure 6:
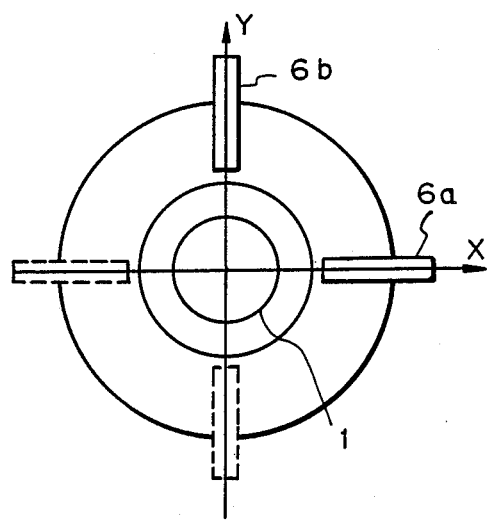
FIG. 6 is a sectional view taken along the line II—II of FIG. 4 if the spindle was supported by a 5-axes control magnetic bearing system in the prior art.

As illustrated in FIG. 1 with reference to FIG. 4, the radial bearing stator 3 in this embodiment has magnetic poles which are formed such as to generate magnetic attraction forces x, y, z radially at equiangular spacings of 120° within a plane perpendicular to the axis of the rotary shaft 1, and stator coil elements 5A, 5B and 5C are respectively wound around the magnetic poles. Sensor elements 6A, 6B and 6C as shown in FIG. 2 which constitute in combination the displacement sensor for measuring relative displacement between the rotary shaft 1 and the casing 7 (see FIG. 4) are disposed at equi-angular spacings of 120° in correspondence to the directions of magnetic attraction forces generated by the magnetic poles of the radial bearing stator 3.

Figure 2:
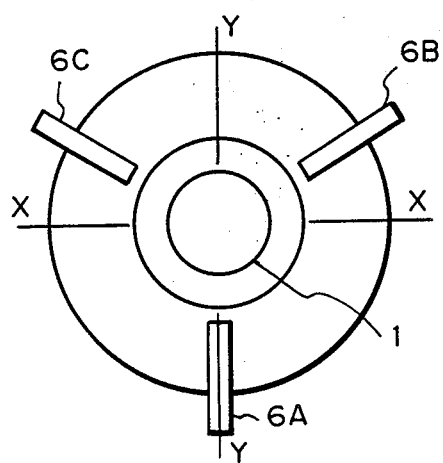
FIG. 2 is a sectional view showing the arrangement of displacement sensor elements for measuring relative displacement between the casing and the rotary shaft.
Figure 3:
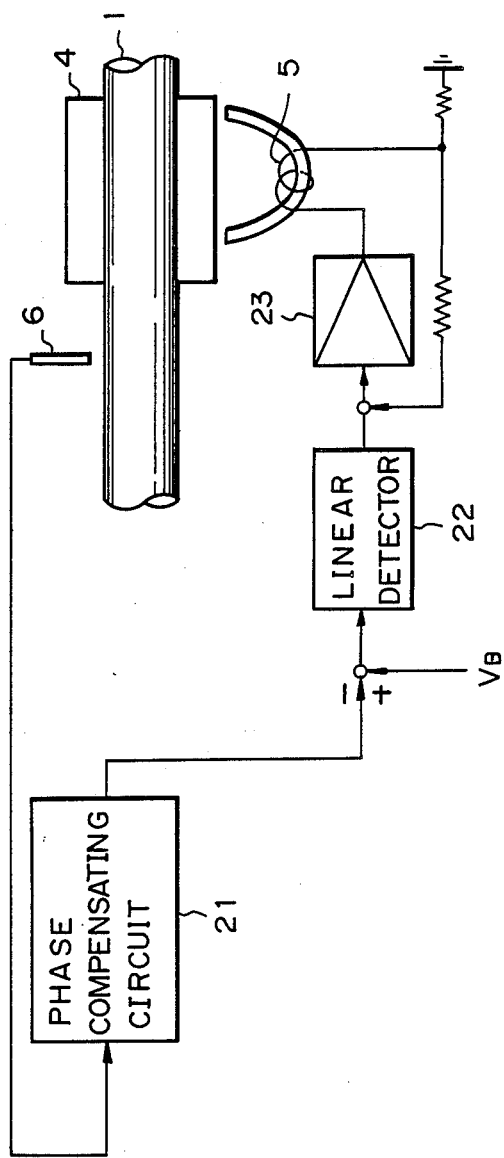
FIG. 3 shows the arrangement of a control circuit disposed between the displacement sensor and the stator coil.

Referring to FIGS. 1 and 2, if the rotary shaft 1 is displaced by an incremental displacement $\epsilon$ toward the Y—Y axis displacement sensor element 6A, the current flowing through the stator coil element 5A increases so as to raise the level of magnetic attraction by $K \cdot \epsilon$. K is the coefficient of magnetic restoring force of each magnetic pole and is expressed as follows:

$$K = \Delta f / \Delta d$$

wherein $\Delta f$: change in magnetic attraction force $\Delta d$: eccentricity of the shaft with respect to the center of the bearing A control circuit as shown in FIG. 3 is so designed that each magnetic pole has substantially the same value for K.

FIG. 3 shows a control circuit which is disposed between each displacement sensor 6 and the corresponding pole coil 5. The control circuit comprises a phase compensating circuit 21, a voltage adding circuit for bias current $V_B$, a linear detector 22, and a power amplifier 23. The phase compensating circuit 21 provides a transfer function having a phase lead and lag characteristic to improve control stability. The voltage adding circuit for bias current $V_B$ and the linear detector 22 are connected in series to provide input and output characteristics for generating signals that cause current to flow in one direction in the magnetic bearing coils.

Figure 7:
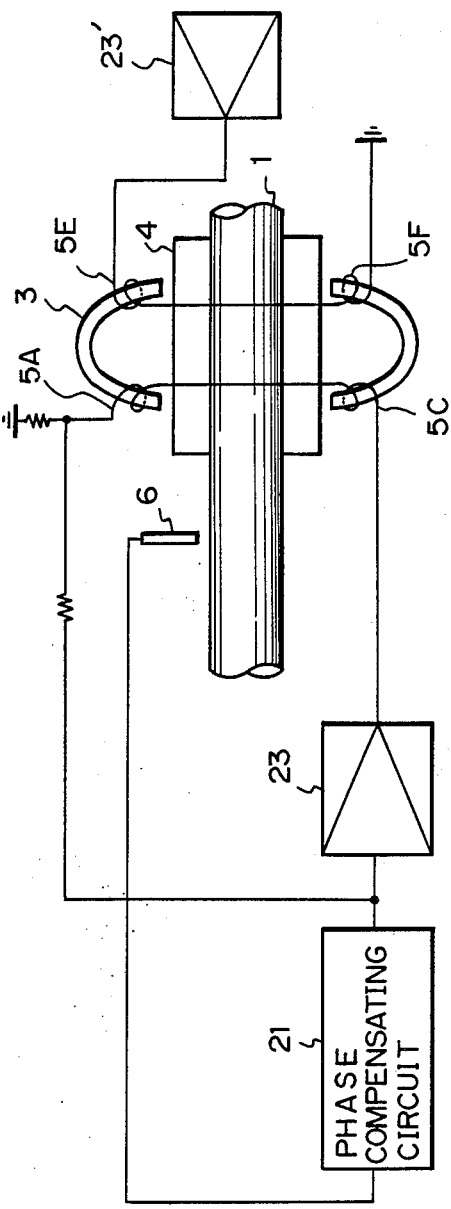
FIGS. 7 and 8 respectively show the arrangements of two examples of a control circuit in the prior art for supplying a predetermined current to the stator coil elements.
Figure 8:
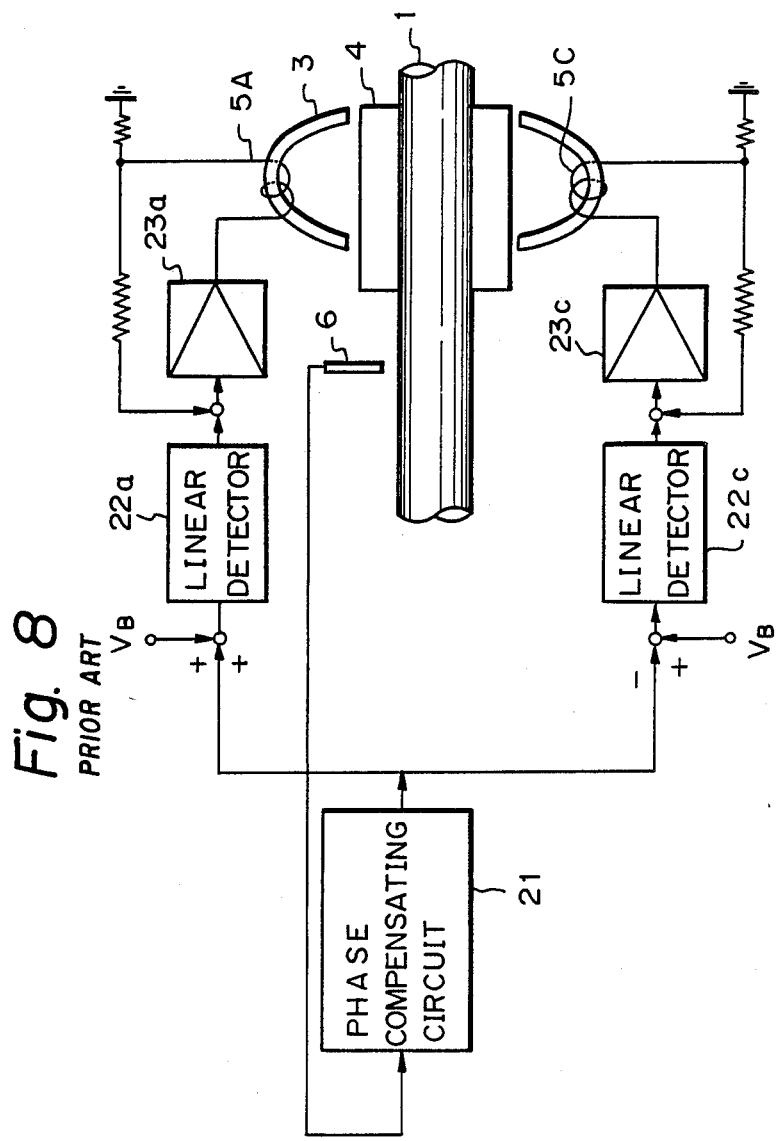

Referring to FIGS. 1 and 7, if the rotary shaft 1 moves an incremental displacement $\epsilon$ in the Y—Y direction, the level of attraction force of the magnetic pole around which the stator coil element 5A is wound increases by $K \cdot \epsilon$ and, at the same time, the level of attraction force of each of the magnetic poles around which the stator coil elements 5B and 5C are respectively wound decreases by $K(\epsilon \cos 60°) \times \cos 60° = K \cdot \epsilon 4$. Accordingly, the sum total of the restoring force is 1.5 K.

When the rotary shaft 1 is displaced by an incremental displacement $\epsilon$ in the X—X direction, no change occurs in the output of the Y—Y direction displacement sensor element 6A and therefore no change occurs in the level of attraction force produced by the stator coil element 5A, either. However, the output of each of the displacement sensor elements 6B and 6C changes by an amount corresponding to $\epsilon \cos 30°$ and the level of attraction force produced by each of the stator coil elements 5B and 5C increases or decreases correspondingly by $K \cdot (\epsilon \cos 30°) \times \cos 30° = 0.75 K \cdot \epsilon$. Therefore, the sum total of the restoring force is 1.5 K·$\epsilon$, which is the same as in the case of the displacement in the Y—Y direction. Thus, it is possible to control the position of the rotary shaft 1 with isotropy.

If the output of each of the displacement sensor element 6A, 6B and 6C changes by an incremental output $\epsilon'$ with the same tendency at the time of thermal deformation or the like, the level of attraction force of each magnetic pole changes by $K \cdot \epsilon'$, but the resultant attraction force is zero since the three magnetic poles are disposed at an equi-angular spacing of 120°. Accordingly, the position of the rotary shaft 1 is not changed and there is therefore no fear of the rotary shaft 1 coming into contact with the casing 7 (or the emergency bearing 2) (see FIG. 4) nor of any failure in the magnetic bearing control of the sort that would otherwise occur when the center of the bearing is displaced from the center of the rotary shaft 1 to a substantial extent.

As described above, the present invention provides the following significant advantages:

(1) Even if the relative position between the sensing surface of the displacement sensor and the center of the bearing changes due to, for example, thermal deformation of the casing, the rotor or the displacement sensor, since the tendency of all the displacement sensor elements to change in output is the same, the levels of the attraction forces of all the magnetic poles change by substantially the same amount and there is therefore no change in the position of the center of the rotary shaft before and after the change in relative position. In other words, it is possible to control the magnetic bearing independently of any drift in the output of the displacement sensor due to thermal deformation or the like.

(2) Since it is only necessary to provide one power amplifier to control each of the magnetic poles for the three directions, the number of power amplifiers required to effect magnetic bearing control within one plane (i.e., biaxial control) can be reduced to three. Accordingly, it is possible to dispense with one power amplifier, a relatively costly item, in comparison with the prior art in which four power amplifiers are used. Thus, it is possible to provide a radial magnetic bearing system at reduced cost.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. A radial magnetic bearing system of the type having a rotor yoke made of a magnetic material which is rigidly secured to a rotary shaft, an electromagnetic stator rigidly secured to a casing with a minute gap provided between said stator and said rotor yoke, said stator having coils for generating magnetomotive force, a displacement sensor for measuring a relative displacement between said rotary shaft and said casing, and a combination of a phase compensation circuit and a power amplifier for controlling the level of magnetic attraction force acting between said rotor yoke and said electromagnetic stator on the basis of a signal output from said displacement sensor, wherein the improvement comprises:

said electromagnetic stator being arranged to generate three magnetic attraction forces radially at equi-angular spacing of 120° within a plane perpendicular to the axis of said rotary shaft, and said displacement sensor which has three displacement sensor element being arranged such that each sensor element measures displacement of said rotary shaft with respect to said casing in the direction of one of the three magnetic attraction forces generated by the electromagnetic stator.

2. A radial magnetic bearing system according to claim 1, wherein the phase compensating circuit, a voltage adding circuit for bias current, a linear detector and the power amplifier are connected in series between each of said displacement sensor elements and the stator coil to control the current supplied to the stator coil.

3. A radial magnetic bearing system comprising:

a rotor yoke made of a magnetic material which is rigidly secured to a rotary shaft;

an electromagnetic stator having three sets of poles, each pole wound with a stator coil and arranged to generate radial magnetic attraction forces in the space between said rotary shaft and said stator at equi-angular spacings of 120° within a plane perpendicular to the axis of said rotary shaft, each set of poles being disposed with a minute gap between each pole and said rotor yoke;

three displacement sensors arranged such that each said sensor measures a displacement of said rotary shaft with respect to said casing in the direction of one of the three magnetic attraction forces and generates an output signal corresponding to the displacement; and a control circuit disposed between each sensor and each stator coil and adapted to control the level of one of the three magnetic attraction forces of said electromagnetic stators based on the signal output from said sensor, whereby equilibrium position of said rotary shaft is determined by result of the three magnetic attraction forces acting in combination.

4. A radial magnetic bearing system according to claim 3, wherein said control circuit comprises a phase compensating circuit, a voltage adding circuit for bias current, a linear detector and a power amplifier, said control circuit being adapted to control current supplied to the stator coil.

* * * * *

UNITED STATES PATENT AND TRADEMARK OFFICE
CERTIFICATE OF CORRECTION

PATENT NO. : 4,942,321

DATED : July 17, 1990

INVENTOR(S) : Yoichi KANEMITSU

It is certified that error appears in the above-identified patent and that said Letters Patent is hereby corrected as shown below:

On the cover page, after Item [76], add the following:

--[73] Assignees: Ebara Research Co., Ltd., Fujisawa; and Ebara Corporation, Tokyo both of Japan--.

Signed and Sealed this

Fourth Day of August, 1992

*Attest:*

DOUGLAS B. COMER

*Attesting Officer*  *Acting Commissioner of Patents and Trademarks*